(12) United States Patent
Guo et al.

(10) Patent No.: US 12,137,423 B2
(45) Date of Patent: Nov. 5, 2024

(54) SAFETY CONTROL METHOD AND APPARATUS

(71) Applicant: Beijing Xiaomi Mobile Software Co., Ltd., Beijing (CN)

(72) Inventors: Shengxiang Guo, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 414 days.

(21) Appl. No.: 17/781,536

(22) PCT Filed: Dec. 2, 2019

(86) PCT No.: PCT/CN2019/122430
§ 371 (c)(1),
(2) Date: Jun. 1, 2022

(87) PCT Pub. No.: WO2021/108956
PCT Pub. Date: Jun. 10, 2021

(65) Prior Publication Data
US 2023/0007597 A1    Jan. 5, 2023

(51) Int. Cl.
*H04W 52/28*    (2009.01)
*H04B 1/3827*    (2015.01)
*H04W 52/36*    (2009.01)

(52) U.S. Cl.
CPC ........ *H04W 52/283* (2013.01); *H04B 1/3838* (2013.01); *H04W 52/367* (2013.01)

(58) Field of Classification Search
CPC .................................................. H04W 52/283
See application file for complete search history.

(56) References Cited

U.S. PATENT DOCUMENTS 10,812,125 B1 *    10/2020   Badic ................. H04W 72/542
2006/0033615 A1 *   2/2006   Nou .................. G08B 13/19647
                                                          340/506

(Continued)

FOREIGN PATENT DOCUMENTS

CN        101998532 A       3/2011
CN        109151967 A       1/2019
CN        110431755 A      11/2019

OTHER PUBLICATIONS

Intel Corporation, "Discussion on NR MIMO maintenance work", 3GPP TSG RAN Meeting #83, RP-190197, Shenzhen, China, Mar. 18-21, 2019, 4 pages.

(Continued)

*Primary Examiner* — Hsinchun Liao
(74) *Attorney, Agent, or Firm* — Volpe Koenig

(57)    ABSTRACT

The present disclosure discloses an electromagnetic radiation safety control method, which belongs to the field of wireless communication technologies. The method includes: a terminal obtains a transmit power threshold according to a service requirement of service transmitted with a base station, performs a step of detecting a relationship between a beam direction and a position of a human body when a relationship between a current transmit power of the terminal and the transmit power threshold meets a specified condition, and reports safety control information to the base station when it is detected the relationship between the beam direction and the position of the human body meets a predetermined relationship, so as to instruct the base station to perform a control operation related to electromagnetic radiation safety.

19 Claims, 5 Drawing Sheets

(56) References Cited

U.S. PATENT DOCUMENTS

2017/0332407 A1 11/2017 Islam et al.
2018/0368081 A1 12/2018 Akkarakaran et al.

OTHER PUBLICATIONS

Qualcomm Incorporated, "Interpretation of maxULdutycycle with lower powers and P-bit usage in PHR", 3GPP TSG-RAN WG4 Meeting #90-Bis, R4-1903127, Xi'an, China, Apr. 8-12, 2019, 2 pages.

Zhang Yinghai et al., "Research on the Electromagnetic Radiation Effects to Mobile Communications System", Telecommunications Science, Jan. 15, 2007, 3 pages.

Samsung, "Clarification on MPE issue per NR_eMIMO Work Item", 3GPP TSG RAN meeting #84, RP-191562, Newport Beach, USA, Jun. 3-7, 2019, 5 pages.

ISA State Intellectual Property Office of the People's Republic of China, International Search Report Issued in Application No. PCT/CN2019/122430, Aug. 27, 2020, WIPO, 4 pages.

Apple "R17 MIMO enhancements""3GPP TSG RAN Meeting #85 RP-192174 Newport Beach, USA, Sep. 16-20, 2019"Sep. 20, 2019, 6 pages.

Intel Corporation "Discussion on NR MIMO maintenance work""3GPP TSG RAN Meeting #83 RP-190573Shenzhen, China, Mar. 18-21, 2019"Mar. 21, 2019,4 pages.

State Intellectual Property Office of the People's Republic of China, Office Action and Search Report Issued in Application No. 2019800034437, Sep. 23, 2022, 9 pages.

ISA State Intellectual Property Office of the People's Republic of China, Written Opinion of the International Searching Authority Issued in Application No. PCT/CN2019/122430, Aug. 27, 2020, WIPO, 6 pages.

Intel Corporation, "NR MPE offline meeting notes", 3GPP TSG-RAN WG4 Meeting #86, R4-1803264,Athens, Greece, Feb. 26-Mar. 2, 2018, 3 pages.

* cited by examiner

SAFETY CONTROL METHOD AND APPARATUS

CROSS REFERENCE TO RELATED APPLICATIONS

This application is the national phase of International Application No. PCT/CN2019/122430, filed on Dec. 2, 2019, the disclosure of which is hereby incorporated by reference in its entirety for all purposes.

TECHNICAL FIELD

The present disclosure relates to the field of wireless communication technologies, in particular to safety control methods and apparatuses.

BACKGROUND

Electromagnetic radiation from mobile terminal devices such as mobile phones, smart watches, computers, and the like will have a certain impact on human safety, especially as terminals that support high frequency and high power gradually become a mainstream in the market, which also objectively increases a risk of electromagnetic radiation of terminals to human safety.

In a 5th generation mobile communication (5G) system, a terminal and a base station can communicate through beamforming technology. However, since a beam in a millimeter wave band is narrow, the radiation is mainly concentrated in a beam direction. In the related art, in the process of communicating with the base station, the terminal needs to continuously detect whether the beam direction points to a human body. If the beam direction points to the human body, a power reduction operation is required.

SUMMARY

The present disclosure provides a safety control method and apparatus. The technical solutions are as follows:

According to a first aspect of the embodiments of the present disclosure, there is provided a safety control method performed by a terminal, and the method includes:
  obtaining a transmit power threshold according to a service requirement of service transmitted between the terminal and a base station;
  detecting a relationship between a beam direction and a position of a human body when a relationship between a current transmit power of the terminal and the transmit power threshold meets a specified condition, where the beam direction is a direction of a beam used by the terminal for a service transmission with the base station; and
  reporting safety control information to the base station when the relationship between the beam direction and the position of the human body meets a predetermined relationship, where the safety control information is used to instruct the base station to perform a control operation related to electromagnetic radiation safety.

According to a second aspect of the embodiments of the present disclosure, there is provided a safety control method perform by a base station, and the method includes:
  receiving safety control information which is reported by a terminal in response to determining that a relationship between a beam direction and a position of a human body meets a predetermined relationship after the terminal obtains a transmit power threshold according to a service requirement, and detects the relationship between the beam direction and the position of the human body when a relationship between a current transmit power of the terminal and the transmit power threshold meets a specified condition; and
  performing a control operation related to electromagnetic radiation safety according to the safety control information.

According to a third aspect of the embodiments of the present disclosure, there is provided a safety control apparatus used in a terminal, and the apparatus includes:
  a processor; and
  a memory configured to store instructions executable by the processor; where the processor is configured to:
  obtain a transmit power threshold according to a service requirement of service transmitted between the terminal and a base station;
  detect a relationship between a beam direction and a position of a human body when a relationship between a current transmit power of the terminal and the transmit power threshold meets a specified condition, where the beam direction is a direction of a beam used by the terminal for a service transmission with the base station; and
  report safety control information to the base station when the relationship between the beam direction and the position of the human body meets a predetermined relationship, where the safety control information is used to instruct the base station to perform a control operation related to electromagnetic radiation safety.

It should be understood that the above general description and the following detailed description are exemplary only, and do not limit the present disclosure.

BRIEF DESCRIPTION OF THE DRAWINGS

The accompanying drawings, which are incorporated into and constitute a part of the specification, illustrate embodiments consistent with the present disclosure, and together with the specification serve to explain the principles of the present disclosure.

DETAILED DESCRIPTION OF THE EMBODIMENTS

Figure 1:
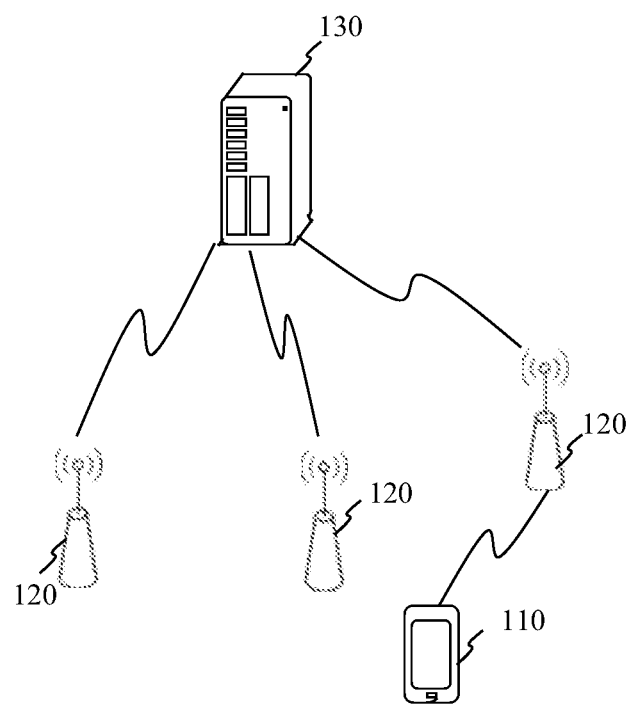
FIG. 1 is a schematic diagram illustrating an implementation environment involved in safety control methods according to some embodiments.

Embodiments will be described in detail herein, examples of which are illustrated in the accompanying drawings. When the following description refers to the drawings, unless otherwise indicated, the same numerals in different drawings indicate the same or similar elements. The embodiments described below do not represent all embodiments consistent with the present disclosure. Rather, they are merely examples of apparatus and method consistent with some aspects of the present disclosure, as recited in the appended claims.

It should be understood that "several" as referred to herein means one or more, and "a plurality" as referred to herein means two or more. "And/or" describes an association relationship between associated objects and indicates that there may be three relationships. For example, A and/or B may indicate that there are three cases where A exists separately, A and B exist at the same time, and B exists separately. The character "/" generally indicates that an "or" relationship exists between contextual objects.

At present, the safety standard for electromagnetic radiation of terminals on human body is expressed by electromagnetic wave absorption ratio or rate (i.e., Specific Absorption Rate, SAR) and maximum permissible exposure (MPE) internationally. SAR is mainly for a low frequency band, such as a frequency band below 6 GHz, while MPE is mainly for a millimeter wave band.

To reduce the impact of terminal transmitting on human safety, it is usually to perform a certain power reduction on the basis of transmit power or reduce an uplink dutycycle of terminal transmitting to meet requirements of SAR or MPE. For example, in 3rd generation partner project (3GPP) radio frequency (RF) standards, a maximum allowed UE output power reduction (P-MPR) is specially introduced, and for a high power terminal, the terminal needs to report a maximum uplink dutycycle capability. When a scheduled uplink dutycycle is greater than the maximum uplink dutycycle, the terminal reduces a transmit level or transmit power. The above method is very effective to meet requirements of low frequency SAR.

However, in a millimeter wave band, since a beam is narrow, the radiation is concentrated. Once the beam is toward a human body, a power reduction of up to 20 dB may be required to meet the requirements of MPE. For such a sudden large power reduction, it is extremely easy to cause the sudden failure of communication links.

On the other hand, since the terminal needs to continuously detect whether the beam is toward the human body, the terminal needs to consume more power for the detection of a beam direction, which affects the cruise ability of the terminal.

Subsequent embodiments of the present disclosure provide a solution for electromagnetic radiation safety control in a beamforming scenario, so that the power consumption of the terminal in the process of the electromagnetic radiation safety control can be reduced while the terminal meets the standard for electromagnetic radiation.

FIG. 1 is a schematic diagram illustrating an implementation environment involved in safety control methods according to some embodiments. As shown in FIG. 1, the implementation environment may include several terminals 110 and base stations 120.

The terminals 110 are wireless communication devices that support a variety of wireless access technologies. For example, the terminals 110 may support cellular mobile communication technology, for example, the 5th generation mobile communication (5G) technology. In some examples, the terminals 110 may also support a next generation mobile communication technology of 5G technology.

In some examples, the terminals 110 may also be user terminal devices, such as mobile phones (or "cellular" phones) and computers with a mobile terminal. For example, the terminals 110 may be portable, pocket-sized, handheld, computer-built-in or vehicle-mounted mobile devices. For some other examples, the terminals 110 may be stations (STAs), subscriber units, subscriber stations, mobile stations, mobiles, remote stations, access points, remote terminals, access terminals, user terminals, user agents, user devices or user equipment (UEs).

In the embodiments of the present disclosure, the terminals 110 may be terminals that support beamforming technology to communicate with the base station.

The base stations 120 may be network side devices in a wireless communication system. The wireless communication system may be a 5G system, also known as a new radio (NR) system. In some examples, the wireless communication system may also be a next generation system of the 5G system.

The base stations 120 may be base stations (gNBs) adopting a centralized and distributed architecture in the 5G system. When the base stations 120 adopt the centralized and distributed architecture, each of the base stations 120 usually includes a central unit (CU) and at least two distributed units (DUs). The central unit is provided with a packet data convergence protocol (PDCP) layer, a radio link control (RLC) layer and a media access control (MAC) layer of a protocol stack. The distributed unit is provided with a physical (PHY) layer of a protocol stack. The embodiments of the present disclosure do not limit the specific implementations of the base stations 120.

The base stations 120 may also be other devices with functions of a base station. For example, the base stations 120 may be relay nodes or other access point devices.

Wireless connection can be established between the base station 120 and the terminal 110 through a wireless air interface. The wireless air interface is a wireless air interface based on standards for the 5th generation mobile communication (5G) network technology. For example, the wireless air interface is a new radio interface; or, the wireless air interface may also be a wireless air interface based on standards for a next generation mobile communication network technology of 5G.

In some embodiments, the foregoing wireless communication system may further include a network management device 130.

Several base stations 120 are respectively connected to the network management device 130. The network management device 130 may be a core network device in the wireless communication system. For example, the network management device 130 may be a mobility management entity (MME) in an evolved packet core (EPC). In some examples, the network management device may be other core network devices, such as a serving gateway (SGW), a public data network gateway (PGW), a policy and charging rules function (PCRF), or a home subscriber server (HSS), etc. The implementation of the network management device 130 is not limited in embodiments of the present disclosure.

Figure 2:
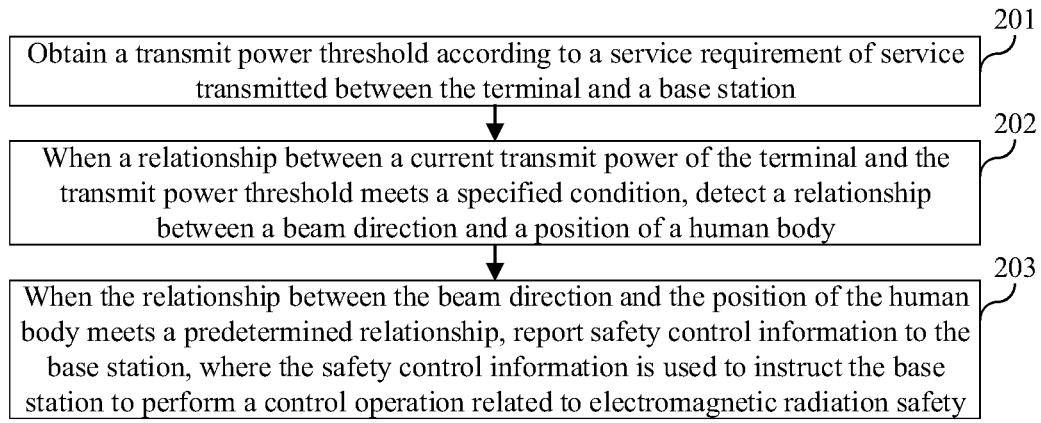
FIG. 2 is a flowchart illustrating a safety control method according to an embodiment.

FIG. 2 is a flowchart illustrating a safety control method according to an embodiment. The safety control method can be performed by a terminal. For example, the terminal can be a terminal 110 in the implementation environment shown in FIG. 1. As shown in FIG. 2, the method may include steps 201-203.

In step 201, a transmit power threshold is obtained according to a service requirement of service transmitted between the terminal and a base station.

In step 202, when a relationship between a current transmit power of the terminal and the transmit power threshold meets a specified condition, a relationship between a beam direction and a position of a human body is detected, where the beam direction is a direction of a beam used by the terminal for a service transmission with the base station.

In step 203, when the relationship between the beam direction and the position of the human body meets a predetermined relationship, safety control information is reported to the base station, where the safety control information is used to instruct the base station to perform a control operation related to electromagnetic radiation safety.

In some examples, the transmit power threshold includes a first power threshold and a second power threshold; obtaining the transmit power threshold according to the service requirement of the service transmitted between the terminal and the base station includes: obtaining a maximum power reduction under a maximum dutycycle corresponding to the service requirement and a maximum power reduction under a minimum dutycycle corresponding to the service requirement; obtaining the first power threshold according to a maximum transmit power of the terminal and the maximum power reduction under the maximum dutycycle; and obtaining the second power threshold according to the maximum transmit power of the terminal and the maximum power reduction under the minimum dutycycle, where the first power threshold is less than the second power threshold.

In some examples, obtaining the first power threshold according to the maximum transmit power of the terminal and the maximum power reduction under the maximum dutycycle includes obtaining a first difference between the maximum transmit power of the terminal and the maximum power reduction under the maximum dutycycle; and taking a sum of the first difference and a power compensation factor as the first power threshold.

In some examples, obtaining the second power threshold according to the maximum transmit power of the terminal and the maximum power reduction under the minimum dutycycle includes: obtaining a second difference between the maximum transmit power of the terminal and the maximum power reduction under the minimum dutycycle; and taking a sum of the second difference and a power compensation factor as the second power threshold.

In some examples, the method further includes: obtaining a distance between the terminal and the human body; and obtaining the power compensation factor according to the distance between the terminal and the human body.

In some examples, detecting the relationship between the beam direction and the position of the human body when the relationship between the current transmit power of the terminal and the transmit power threshold meets the specified condition includes: detecting whether the beam direction points to the human body when the current transmit power of the terminal is between the first power threshold and the second power threshold; reporting the safety control information to the base station when the relationship between the beam direction and the position of the human body meets the predetermined relationship includes reporting first safety control information to the base station when the beam direction points to the human body, where the first safety control information is used to instruct the base station to reduce a dutycycle.

In some examples, detecting the relationship between the beam direction and the position of the human body when the relationship between the current transmit power of the terminal and the transmit power threshold meets the specified condition includes: detecting whether the beam is moving toward a direction of the human body when the current transmit power of the terminal is greater than or equal to the second power threshold; reporting the safety control information to the base station when the relationship between the beam direction and the position of the human body meets the predetermined relationship includes: reporting second safety control information to the base station when the beam is moving toward the direction of the human body, where the second safety control information is used to instruct the base station to prepare to switch the beam used by the terminal to a beam that does not point to or partially points to the direction of the human body.

To sum up, in the solutions according to the embodiments of the present disclosure, the terminal can obtain the transmit power threshold according to the service requirement of the service transmitted between the terminal and the base station, perform the step of detecting the relationship between the beam direction and the position of the human body when the relationship between the current transmit power of the terminal and the transmit power threshold meets the specified condition, and report the safety control information to the base station when it is detected that the relationship between the beam direction and the position of the human body meets the predetermined relationship, so as to instruct the base station to perform the control operation related to the electromagnetic radiation safety. In the above solutions, the terminal does not need to continuously detect the relationship between the beam direction and the position of the human body, but only needs to perform the detection step when the relationship between the current transmit power of the terminal and the transmit power threshold meets the specified condition. Thus, the power consumption of the terminal in the process of electromagnetic radiation safety control can be significantly reduced.

Figure 3:
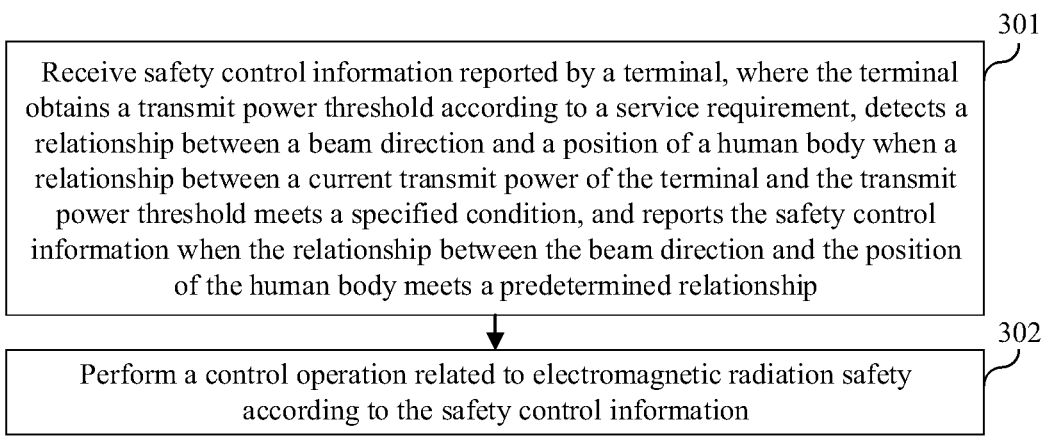
FIG. 3 is a flowchart illustrating a safety control method according to an embodiment.

FIG. 3 is a flowchart illustrating a safety control method according to an embodiment. The safety control method can be performed by a base station. For example, the base station can be a base station 120 in the implementation environment shown in FIG. 1. As shown in FIG. 3, the method may include steps 301-302.

In step 301, safety control information reported by a terminal is received, where the terminal obtains a transmit power threshold according to a service requirement, detects a relationship between a beam direction and a position of a human body when a relationship between a current transmit power of the terminal and the transmit power threshold meets a specified condition, and reports the safety control information when the relationship between the beam direction and the position of the human body meets a predetermined relationship.

In step 302, a control operation related to electromagnetic radiation safety is performed according to the safety control information.

In some examples, performing the control operation related to the electromagnetic radiation safety according to the safety control information includes: reducing a dutycycle of the terminal when the safety control information is first safety control information; and preparing to switch a beam used by the terminal to a beam that does not point to or partially points to a direction of the human body when the safety control information is second safety control information.

To sum up, in the solutions according to the embodiments of the present disclosure, the terminal can obtain the transmit power threshold according to the service requirement of the service transmitted between the terminal and the base station, perform the step of detecting the relationship between the beam direction and the position of the human body when the relationship between the current transmit power of the terminal and the transmit power threshold meets the specified condition, and report the safety control information to the base station when it is detected that the relationship between the beam direction and the position of the human body meets the predetermined relationship, so that the base station performs the control operation related to the electromagnetic radiation safety according to the safety control information. In the above solutions, the terminal does not need to continuously detect the relationship between the beam direction and the position of the human body, but only needs to perform the detection step when the relationship between the current transmit power of the terminal and the transmit power threshold meets the specified condition. Thus, the power consumption of the terminal in the process of electromagnetic radiation safety control can be significantly reduced.

Figure 4:
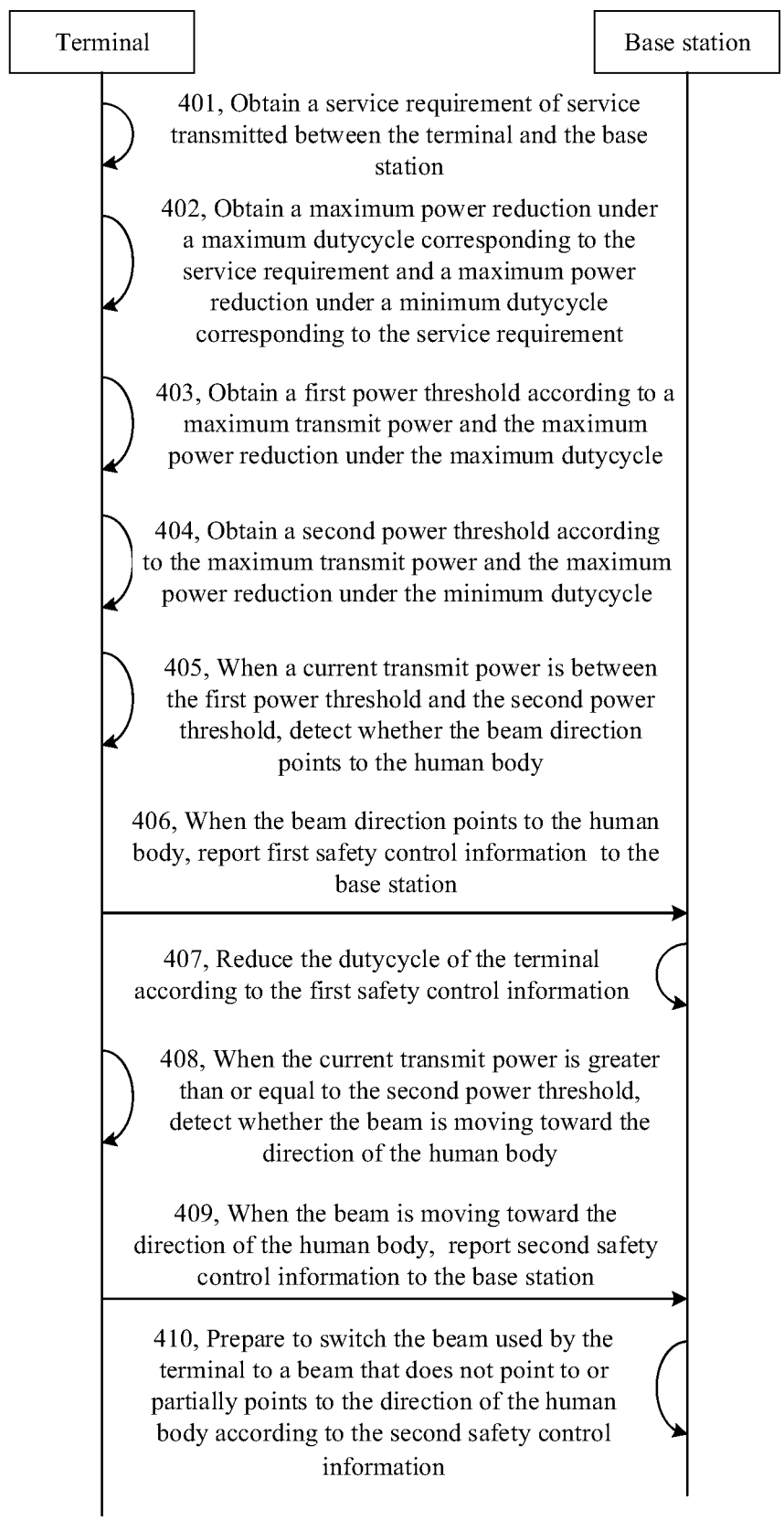
FIG. 4 is a flowchart illustrating a safety control method according to an embodiment.

FIG. 4 is a flowchart illustrating a safety control method according to an embodiment. The safety control method can be performed by a terminal and a base station in an interactive way. For example, the terminal can be the terminal 110 in the implementation environment shown in FIG. 1, and the base station can be the base station 120 in the implementation environment shown in FIG. 1. As shown in FIG. 4, the method may include steps 401-410.

In step 401, the terminal obtains a service requirement of service transmitted between the terminal and the base station.

In the embodiment of the present disclosure, the terminal and the base station can communicate through beamforming technology. When service data is transmitted between the terminal and the base station, the service requirement of the service transmitted between the terminal and the base station can be obtained. For example, the service requirement may be a quality of service (QoS) requirement.

In step 402, the terminal obtains a maximum power reduction under a maximum dutycycle corresponding to the service requirement and a maximum power reduction under a minimum dutycycle corresponding to the service requirement.

In the embodiment of the present disclosure, the maximum power reduction when the dutycycle=Xmax can be expressed by $P\text{-MPR}_{dutycycle=Xmax}$, and the unit is decibel (dB). A value of $P\text{-MPR}_{dutycycle=Xmax}$ can be given by a manufacturer according to product tests, where Xmax is a maximum possible dutycycle determined by the terminal according to the service requirement. For example, it is assumed that Xmax=100%.

Similarly, the maximum power reduction when dutycycle=Xmin can be expressed by $P\text{-MPR}_{dutycycle=Xmin}$, and the unit is decibel (dB). A value of $P\text{-MPR}_{dutycycle=Xmin}$ can also be given by the manufacturer according to the product tests, where Xmin is the minimum possible dutycycle determined by the terminal according to the service requirement. For example, it is assumed that the dutycycle of voice service is 50% and the dutycycle of data service is 5%.

In step 403, the terminal obtains a first power threshold according to a maximum transmit power of the terminal and the maximum power reduction under the maximum dutycycle.

In some embodiments, when obtaining the first power threshold according to the maximum transmit power of the terminal and the maximum power reduction under the maximum dutycycle, the terminal may obtain a first difference between the maximum transmit power of the terminal and the maximum power reduction under the maximum dutycycle; and take a sum of the first difference and a power compensation factor as the first power threshold.

For example, the terminal may calculate the first power threshold by the following power:

$$P_m - P\text{-MPR}_{dutycycle=Xmax} + P_d;$$

Where $P_m$ is the maximum transmit power of the terminal and $P_d$ is the power compensation factor.

In some examples, the terminal can obtain a distance between the terminal and the human body; and obtain the power compensation factor according to the distance between the terminal and the human body.

The unit of the power compensation factor $P_d$ is also dB, and the power compensation factor $P_d$ is also given by the manufacturer according to the product realization. In the embodiment of the present disclosure, $P_d$ is related to the distance between the terminal and the human body, and the terminal can determine the value of $P_d$ according to the distance from the human body.

For example, when the terminal is in a talk state and close to an ear, $P_d=0$ dB; and when the terminal is in a handheld state, $P_d=5$ dB.

In step 404, the terminal obtains a second power threshold according to the maximum transmit power of the terminal and the maximum power reduction under the minimum dutycycle.

The first power threshold is less than the second power threshold.

In some examples, when obtaining the second power threshold according to the maximum transmit power of the terminal and the maximum power reduction under the minimum dutycycle, the terminal can obtain a second difference between the maximum transmit power of the terminal and the maximum power reduction under the minimum dutycycle; and take a sum of the second difference and the power compensation factor as the second power threshold.

For example, the terminal may calculate the second power threshold by the following power:

$$P_m - P\text{-MPR}_{dutycycle=Xmin} + P_d.$$

In step 405, when a current transmit power of the terminal is between the first power threshold and the second power threshold, it is detected whether the beam direction points to the human body.

Figure 5:
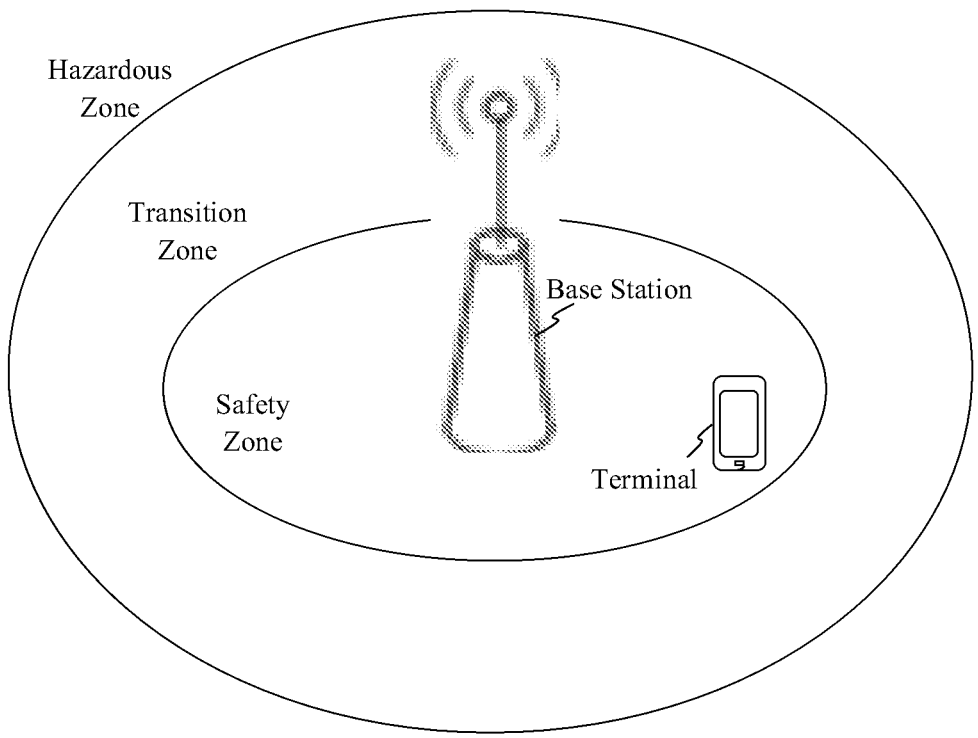
FIG. 5 is a schematic diagram illustrating zone division involved in the embodiment shown in FIG. 4.

Referring to FIG. 5, FIG. 5 shows a schematic diagram of zone division according to the embodiments of the present disclosure. As shown in FIG. 5, in the embodiments of the present disclosure, the terminal can divide the current transmit power of the terminal into three zones according to the difference between the current transmit power and the maximum allowable transmit power meeting requirements of MPE. In some examples, the division method is as follows:

safety zone: $P-(P_m - P\text{-MPR}_{dutycycle=Xmax} + P_d) \leq 0;$ transition zone: $P-(P_m - P\text{-MPR}_{dutycycle=Xmax} + P_d) > 0,$ and $P-(P_m - P\text{-MPR}_{dutycycle=Xmin} + P_d) \leq 0;$ hazardous zone: $P-(P_m - P\text{-MPR}_{dutycycle=Xmin} P_d) \geq 0;$ When the current transmit power of the terminal is in the safe zone, the terminal does not need to consider the MPE at this time, so there is no need to perform the step of detecting whether the beam direction is toward the human body.

When the current transmit power of the terminal is in the transition zone, the terminal starts to detect whether the beam direction is toward the human body.

The beam direction may be the beam direction of an uplink beam and/or the beam direction of a downlink beam.

When the terminal detects whether the beam direction points to the human body, it can be defaulted that the direction which the front of the terminal is toward is the direction of the human body. The terminal can obtain whether the detected beam direction points to the direction which the front of the terminal is toward. If so, it can be determined that the beam direction is toward the direction of the human body. Otherwise, it can be determined that the beam direction is not toward the direction of the human body.

Referring back to FIG. 4, in step 406, when the beam direction points to the human body, first safety control information is reported to the base station, and accordingly, the base station receives the first safety control information. The first safety control information is used to instruct the base station to reduce the dutycycle.

In the embodiment of the present disclosure, when the current transmit power of the terminal is in the transition zone, if it is detected that the beam direction of the terminal points to the direction of the human body, the first safety control information for instructing to reduce the dutycycle is reported to the base station.

In step 407, the base station reduces the dutycycle of the terminal according to the first safety control information.

In the embodiment of the present disclosure, after receiving the first safety information reported by the terminal, the base station can reduce the dutycycle of the terminal to control the terminal to reduce the transmit power.

In some examples, the first safety control information may include a reduction value of the dutycycle, and the base station can schedule the terminal to reduce the dutycycle according to the reduction value.

As shown in FIG. 5, the closer the terminal is to the base station, the lower the transmit power is required. Accordingly, the farther the terminal is from the base station, the higher the transmit power is required. When the current transmit power of the terminal is in the safe zone, the terminal is close to the base station, only a low transmit power is required to meet an uplink transmission demand. At this time, MPE does not need to be considered, so there is no need to detect whether the beam direction is toward the human body. When the current transmit power of the terminal is in the transition zone, the distance between the terminal and the base station is moderate, and only a moderate transmit power is required to meet the uplink transmission demand. However, there may still be a case that a high transmit power is required, which leads to the transmit power not meeting the requirements of MPE. Therefore, the terminal may detect whether the beam direction is toward the human body. If it is detected that the beam direction is toward the human body, the terminal can interact with the base station to perform a power reduction operation. At this time, the terminal only needs the moderate transmit power to meet the uplink transmission demand, therefore, the power reduction operation will not cause that the power is reduced too much and then the uplink transmission demand is not met.

Referring back to FIG. 4, in step 408, when the current transmit power of the terminal is greater than or equal to the second power threshold, it is detected whether the beam is moving toward the direction of the human body.

As shown in FIG. 5, in the embodiment of the present disclosure, when the current transmit power of the terminal is in the hazardous zone, the terminal can continuously detect the relationship between the beam direction and the direction of the human body, and determine whether the beam is moving toward the direction of the human body.

Referring back to FIG. 4, in step 409, when the beam is moving toward the direction of the human body, second safety control information is reported to the base station, and accordingly, the base station receives the second safety control information.

The second safety control information is used to instruct the base station to prepare to switch the beam used by the terminal to a beam that does not point to or partially points to the direction of the human body.

In the embodiment of the present disclosure, when the current transmit power of the terminal is in the hazardous zone and the terminal detects that the beam is moving toward the direction of the human body, the terminal can report the second safety control information for instructing to prepare to switch the beam to the base station.

In step 410, the base station prepares to switch the beam used by the terminal to a beam that does not point to or partially points to the direction of the human body according to the second safety control information.

As shown in FIG. 5, when the current transmit power of the terminal is in the hazardous zone, the distance between the terminal and the base station is also relatively far. At this time, the terminal needs a high transmit power to meet the uplink transmission demand. At this time, if the terminal detects that the beam direction points to the direction of the human body and performs power reduction, it is likely to lead to a sudden large power reduction and cause a sudden failure of communication links.

Therefore, in the embodiment of the present disclosure, when the current transmit power of the terminal is in the hazardous zone, the terminal can continuously detect whether the beam is moving toward the direction of the human body. If it is detected that the beam is moving toward the direction of the human body, the terminal can notify the base station to prepare to switch the current beam to other beams that do not point to or partially points to the direction of the human body, so that the beam switching can be completed quickly when it is determined to perform the beam switching subsequently. Therefore, there is no need to perform power reduction, and the sudden failure of the communication links can be avoided.

For example, as shown in FIG. 5, a user is using a mobile phone to make a call while the user is moving outward from a center of a base station. The terminal can divide the current transmit power of the terminal into the three zones according to the difference between the current transmit power and the maximum allowable transmit power meeting the requirements of MPE. The division method is as described in step 405 above, which will not be repeated here.

When the current transmit power of the terminal is in the safe zone, the terminal does not need to consider MPE and does not need to turn on a detection device to detect whether the beam is toward the human body.

When the current transmit power of the terminal is in the transition zone, the terminal needs to detect whether the beam is toward the human body. When it is found that the beam is toward the human body, the terminal reports, to the base station, a message to request to reduce the dutycycle.

The message reported by the terminal to the base station may be indication information of 1 bit, for example, 0 indicates the transition zone and 1 indicates the hazardous zone, or vice versa. The reported information can also be information including the value of the specific dutycycle reduction. The dutycycle reduction value can be estimated by the terminal according to the current transmit power and dutycycle.

When the current transmit power of the terminal enters the hazardous zone, the terminal needs to detect the beam direction. Once it is detected that the beam starts to move toward the human body, the terminal notifies the base station to prepare to switch the beam to other beams that is not toward or is partially toward the human body.

In another embodiment, in case that the terminal is equipped with a human body distance detector (such as a distance sensor on the front of a mobile phone), when the zone to which the current transmit power of the terminal belongs is determined according to the above method, the power compensation factor $P_D$ can be further expressed as $P_D=X*\Delta$, where X is the distance between the terminal and the human body detected by the distance detector, $\Delta$ may be a value preset by the terminal, for example, $\Delta$ may be a value preset by a manufacturer of the terminal according to its own products.

In another embodiment, when determining that the current transmit power of the terminal is in the transition zone according to the above method, if the base station cannot schedule a lower uplink dutycycle for some reason or even needs to increase the uplink dutycycle, the terminal calculates the formula of a boundary between the transition zone and the hazardous zone, that is, the formula $P-(P_m-P-MPR_{dutycycle=Xmin}+P_d)$ corresponding to the second power threshold by replacing $MPR_{dutycycle=Xmin}$ with the MPR corresponding to a current dutycycle. The MPR corresponding to the current dutycycle can be expressed by $MPR_{dutycycle}$, and the value of $MPR_{dutycycle}$ can be determined by $MPR_{dutycycle=Xmax}$ and $MPR_{dutycycle=Xmin}$. For example, the terminal can calculate through a linear method according to the following formula:

$$MPR_{dutycycle} = MPR_{dutycycle=Xmin} + \frac{dutycycle - Xmin}{Xmax - Xmin} * (MPR_{dutycycle=Xmax} - MPR_{dutycycle=Xmin})$$

To sum up, in the solutions according to the embodiments of the present disclosure, the terminal can obtain the transmit power threshold according to the service requirement of the service transmitted between the terminal and the base station, and perform the step of detecting the relationship between the beam direction and the position of human body when the relationship between the current transmit power of the terminal and the transmit power threshold meets the specified condition, and report the safety control information to the base station when it is detected that the relationship between the beam direction and the position of human body meets the predetermined relationship, and the base station performs the control operation related to the electromagnetic radiation safety according to the safety control information. In the above solutions, the terminal does not need to continuously detect the relationship between the beam direction and the position of human body, but only needs to perform the detection step when the relationship between the current transmit power of the terminal and the transmit power threshold meets the specified condition. Thus, the power consumption of the terminal in the process of electromagnetic radiation safety control can be significantly reduced.

The following is embodiments of apparatuses in the present disclosure, which can be used to perform the embodiments of the methods in the present disclosure. For details not disclosed in the embodiments of the apparatuses of the present disclosure, the embodiments of the methods of the present disclosure can be referred to.

Figure 6:
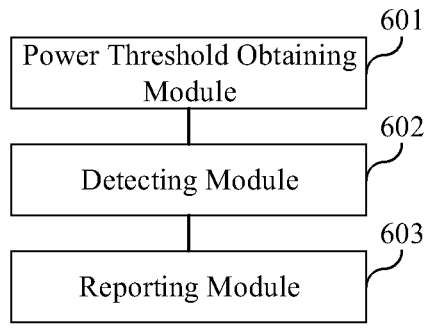
FIG. 6 is a block diagram illustrating a safety control apparatus according to an embodiment.

FIG. 6 is a block diagram illustrating a safety control apparatus according to an embodiment. As shown in FIG. 6, the resource switching apparatus can be implemented as all or part of the terminal 110 in the implementation environment shown in FIG. 1 by hardware or a combination of software and hardware, so as to perform the steps performed by the terminal in the embodiment shown in FIG. 2 or FIG. 3. The safety control apparatus may include: a power threshold obtaining module 601, a detecting module 602 and a reporting module 603.

The power threshold obtaining module 601 is configured to obtain a transmit power threshold according to a service requirement of service transmitted between the terminal and a base station.

The detecting module 602 is configured to detect a relationship between a beam direction and a position of a human body when a relationship between a current transmit power of the terminal and the transmit power threshold meets a specified condition, where the beam direction is a direction of a beam used by the terminal for a service transmission with the base station.

The reporting module 603 is configured to report safety control information to the base station when the relationship between the beam direction and the position of the human body meets a predetermined relationship, where the safety control information is used to instruct the base station to perform a control operation related to electromagnetic radiation safety.

In some examples, the transmit power threshold includes a first power threshold and a second power threshold. The power threshold obtaining module includes: a reduction obtaining sub-module, configured to obtain a maximum power reduction under a maximum dutycycle corresponding to the service requirement and a maximum power reduction under a minimum dutycycle corresponding to the service requirement; a first threshold obtaining sub-module, configured to obtain the first power threshold according to a maximum transmit power of the terminal and the maximum power reduction under the maximum dutycycle; and a second threshold obtaining sub-module, configured to obtain the second power threshold according to the maximum transmit power of the terminal and the maximum power reduction under the minimum dutycycle, where the first power threshold is less than the second power threshold.

In some examples, the first threshold obtaining sub-module is configured to: obtain a first difference between the maximum transmit power of the terminal and the maximum power reduction under the maximum dutycycle; and take a sum of the first difference and a power compensation factor as the first power threshold.

In some examples, the second threshold obtaining sub-module is configured to: obtain a second difference between the maximum transmit power of the terminal and the maximum power reduction under the minimum dutycycle; and take a sum of the second difference and a power compensation factor as the second power threshold.

In some examples, the apparatus further includes: a distance obtaining module, configured to obtain a distance between the terminal and the human body; and a compensation factor obtaining module, configured to obtain the power compensation factor according to the distance between the terminal and the human body.

In some examples, the detecting module includes: a first detecting sub-module, configured to detect whether the beam direction points to the human body when the current transmit power of the terminal is between the first power threshold and the second power threshold; and the reporting module includes: a first reporting sub-module, configured to report first safety control information to the base station when the beam direction points to the human body, where the first safety control information is used to instruct the base station to reduce a dutycycle.

In some examples, the detecting module includes: a second detecting sub-module, configured to detect whether the beam is moving toward a direction of the human body when the current transmit power of the terminal is greater than or equal to the second power threshold; and the reporting module includes: a second reporting sub-module, configured to report second safety control information to the base station when the beam is moving toward the direction of the human body, where the second safety control information is used to instruct the base station to prepare to switch the beam used by the terminal to a beam that does not point to or partially points to the direction of the human body.

To sum up, in the solutions according to the embodiments of the present disclosure, the terminal can obtain the transmit power threshold according to the service requirement of the service transmitted between the terminal and the base station, perform the step of detecting the relationship between the beam direction and the position of the human body when the relationship between the current transmit power of the terminal and the transmit power threshold meets the specified condition, and report the safety control information to the base station when it is detected that the relationship between the beam direction and the position of the human body meets the predetermined relationship, so that the base station performs the control operation related to the electromagnetic radiation safety according to the safety control information. In the above solutions, the terminal does not need to continuously detect the relationship between the beam direction and the position of the human body, but only needs to perform the detection step when the relationship between the current transmit power of the terminal and the transmit power threshold meets the specified condition. Thus, the power consumption of the terminal in the process of electromagnetic radiation safety control can be significantly reduced.

Figure 7:
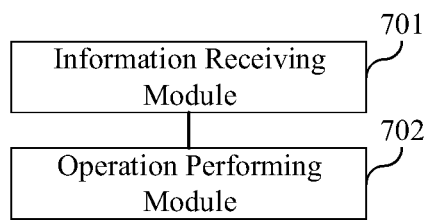
FIG. 7 is a block diagram illustrating a safety control apparatus according to an embodiment.

FIG. 7 is a block diagram illustrating a safety control apparatus according to an embodiment. As shown in FIG. 7, the resource switching apparatus can be implemented as all or part of the base station 120 in the implementation environment shown in FIG. 1 by hardware or a combination of software and hardware, so as to perform the steps performed by the base station in the embodiment shown in FIG. 2 or FIG. 3. The safety control apparatus may include an information receiving module 701 and an operation performing module 702.

The information receiving module 701 is configured to receive safety control information reported by a terminal, where the terminal obtains a transmit power threshold according to a service requirement, detects a relationship between a beam direction and a position of a human body when a relationship between a current transmit power of the terminal and the transmit power threshold meets a specified condition, and reports the safety control information when the relationship between the beam direction and the position of the human body meets a predetermined relationship.

The operation performing module 702 is configured to perform a control operation related to electromagnetic radiation safety according to the safety control information.

In some examples, the operation performing module 702 includes: a dutycycle reducing sub-module, configured to reduce a dutycycle of the terminal when the safety control information is first safety control information; and a switching preparing sub-module, configured to prepare to switch a beam used by the terminal to a beam that does not point to or partially points to a direction of the human body when the safety control information is second safety control information.

To sum up, in the solutions according to the embodiments of the present disclosure, the terminal can obtain the transmit power threshold according to the service requirement of the service transmitted between the terminal and the base station, perform the step of detecting the relationship between the beam direction and the position of the human body when the relationship between the current transmit power of the terminal and the transmit power threshold meets the specified condition, and report the safety control information to the base station when it is detected that the relationship between the beam direction and the position of the human body meets the predetermined relationship, so that the base station performs the control operation related to the electromagnetic radiation safety according to the safety control information. In the above solutions, the terminal does not need to continuously detect the relationship between the beam direction and the position of the human body, but only needs to perform the detection step when the relationship between the current transmit power of the terminal and the transmit power threshold meets the specified condition. Thus, the power consumption of the terminal in the process of electromagnetic radiation safety control can be significantly reduced.

It should be noted that when the apparatuses provided by the above embodiments realizes their functions, it is only exemplified and explained by the division of the above functional modules. In practical application, the above functions can be allocated by different functional modules according to the actual needs, that is, the structure of the apparatus can be divided into different functional modules to complete all or part of the functions described above.

As for the apparatuses in the above embodiments, the specific manner in which each module performs operations has been described in detail in the embodiments of the methods, and will not be explained in detail here.

An embodiment of the present disclosure provides a safety control apparatus capable of realizing all or part of the steps performed by the terminal in the embodiment shown in FIG. 2 or FIG. 3 of the present disclosure. The safety control apparatus includes: a processor, and a memory configured to store instructions executable by the processor; where the processor is configured to: obtain a transmit power threshold according to a service requirement of service transmitted between a terminal and a base station; detect a relationship between a beam direction and a position of a human body when a relationship between a current transmit power of the terminal and the transmit power threshold meets a specified condition, where the beam direction is a direction of a beam used by the terminal for a service transmission with the base station; and report safety control information to the base station when the relationship between the beam direction and the position of the human body meets a predetermined relationship, where the safety control information is used to instruct the base station to perform a control operation related to electromagnetic radiation safety.

In some examples, the transmit power threshold includes a first power threshold and a second power threshold; obtaining the transmit power threshold according to the service requirement of the service transmitted between the terminal and the base station includes: obtaining a maximum power reduction under a maximum dutycycle corresponding to the service requirement and a maximum power reduction under a minimum dutycycle corresponding to the service requirement; obtaining the first power threshold according to a maximum transmit power of the terminal and the maximum power reduction under the maximum dutycycle; and obtaining the second power threshold according to the maximum transmit power of the terminal and the maximum power reduction under the minimum dutycycle, where the first power threshold is less than the second power threshold.

In some examples, obtaining the first power threshold according to the maximum transmit power of the terminal and the maximum power reduction under the maximum dutycycle includes: obtaining a first difference between the maximum transmit power of the terminal and the maximum power reduction under the maximum dutycycle; and taking a sum of the first difference and a power compensation factor as the first power threshold.

In some examples, obtaining the second power threshold according to the maximum transmit power of the terminal and the maximum power reduction under the minimum dutycycle includes: obtaining a second difference between the maximum transmit power of the terminal and the maximum power reduction under the minimum dutycycle; and taking a sum of the second difference and a power compensation factor as the second power threshold.

In some examples, the processor is further configured to: obtain a distance between the terminal and the human body; and obtain the power compensation factor according to the distance between the terminal and the human body.

In some examples, detecting the relationship between the beam direction and the position of the human body when the relationship between the current transmit power of the terminal and the transmit power threshold meets the specified condition includes: detecting whether the beam direction points to the human body when the current transmit power of the terminal is between the first power threshold and the second power threshold; and reporting the safety control information to the base station when the relationship between the beam direction and the position of the human body meets the predetermined relationship includes: reporting first safety control information to the base station when the beam direction points to the human body, where the first safety control information is used to instruct the base station to reduce a dutycycle.

In some examples, detecting the relationship between the beam direction and the position of the human body when the relationship between the current transmit power of the terminal and the transmit power threshold meets the specified condition includes: detecting whether the beam is moving toward a direction of the human body when the current transmit power of the terminal is greater than or equal to the second power threshold; and reporting the safety control information to the base station when the relationship between the beam direction and the position of the human body meets the predetermined relationship includes: reporting second safety control information to the base station when the beam is moving toward the direction of the human body, where the second safety control information is used to instruct the base station to prepare to switch the beam used by the terminal to a beam that does not point to or partially points to the direction of the human body.

An embodiment of the present disclosure provides a safety control apparatus capable of realizing all or part of the steps performed by the base station in the above embodiment shown in FIG. 2 or FIG. 3 of the present disclosure. The safety control apparatus includes: a processor, and a memory configured to store instructions executable by the processor; where the processor is configured to: receive safety control information reported by a terminal, where the terminal obtains a transmit power threshold according to a service requirement, detects a relationship between a beam direction and a position of a human body when a relationship between a current transmit power of the terminal and the transmit power threshold meets a specified condition, and reports the safety control information when the relationship between the beam direction and the position of the human body meets a predetermined relationship; and perform a control operation related to electromagnetic radiation safety according to the safety control information.

In some examples, performing the control operation related to the electromagnetic radiation safety according to the safety control information includes: reducing a dutycycle of the terminal when the safety control information is first safety control information; and preparing to switch a beam used by the terminal to a beam that does not point to or partially points to a direction of the human body when the safety control information is second safety control information.

The foregoing mainly takes terminals and base stations as examples to introduce the solutions provided by the embodiments of the present disclosure. It can be understood that, in order to implement the above-mentioned functions, the user equipment includes the corresponding hardware structures and/or software modules that perform various functions. In combination with the modules and algorithm steps of the examples described in the embodiments disclosed in the present disclosure, the embodiments of the present disclosure can be implemented in the form of hardware or a combination of hardware and computer software. Whether a certain function is executed by hardware or computer software driving hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 8:
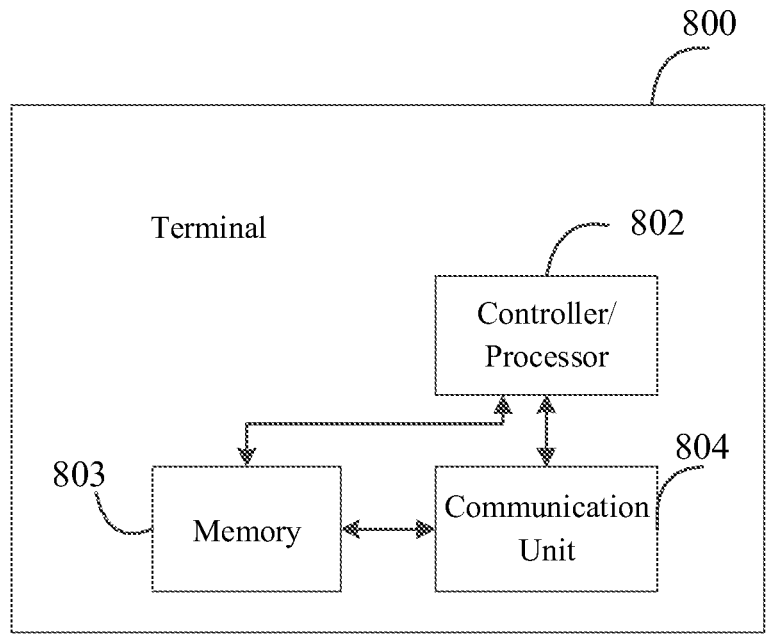
FIG. 8 is a schematic structural diagram illustrating a terminal according to an embodiment.

FIG. 8 is a schematic structural diagram illustrating a terminal according to an embodiment. The terminal may be implemented as the terminal in the system environment as shown in FIG. 1.

The terminal 800 includes a communication unit 804 and a processor 802. The processor 802 can also be a controller, which is represented as "controller/processor 802" in FIG. 8. The communication unit 804 is configured to support the terminal to communicate with other network entities (such as other terminals or base stations).

Further, the terminal 800 may also include a memory 803 configured to store program codes and data of the terminal 800.

It can be understood that FIG. 8 only shows a simplified design of the terminal 800. In practical application, the terminal 800 may include any number of processors, controllers, memories, communication units, etc., and all terminals that can implement the embodiments of the present disclosure are within the protection scope of the embodiments of the present disclosure.

Figure 9:
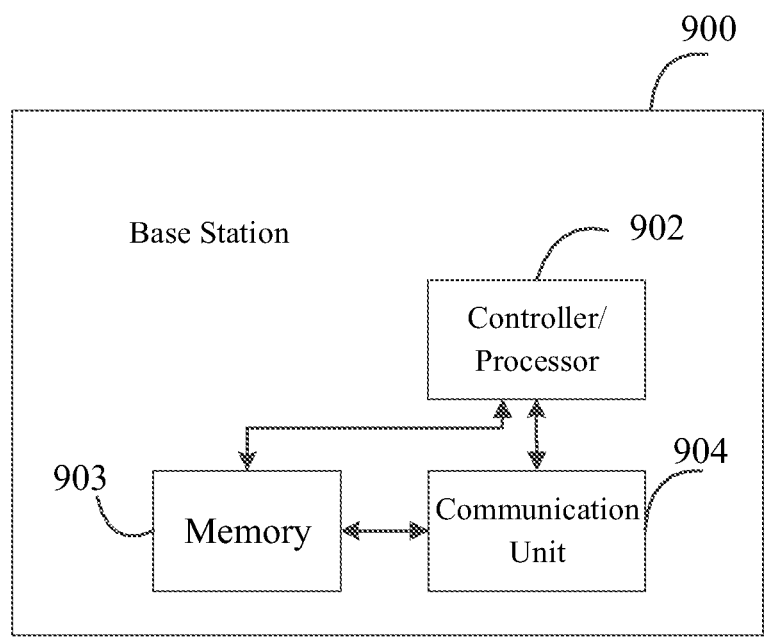
FIG. 9 is a schematic structural diagram illustrating a base station according to an embodiment.

FIG. 9 is a schematic structural diagram illustrating a base station according to an embodiment. The base station can be implemented as the base station in the system environment shown in FIG. 1.

The base station 900 includes a communication unit 904 and a processor 902. The processor 902 can also be a controller, which is represented as "controller/processor 902" in FIG. 9. The communication unit 904 is configured to support the base station to communicate with other network entities (such as other terminals or base stations).

Further, the base station 900 may also include a memory 903 configured to store program codes and data of the base station 900.

It can be understood that FIG. 9 only shows a simplified design of the base station 900. In practical application, the base station 900 may include any number of processors, controllers, memories, communication units, etc., and all base stations that can implement the embodiments of the present disclosure are within the protection scope of the embodiments of the present disclosure.

Those skilled in the art should be aware that, in one or more of the foregoing examples, the functions described in embodiments of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium. The communication medium includes any medium that facilitates the transfer of a computer program from one place to another. The storage medium may be any available medium that can be accessed by a general-purpose or special-purpose computer.

An embodiment of the present disclosure also provides a computer storage medium for storing computer software instructions used by the above-mentioned terminal or base station. The computer software instructions include a program designed for performing the above-mentioned safety control method.

Those skilled in the art will readily recognize other embodiments of the present disclosure upon consideration of the specification and practice of the present disclosure disclosed herein. The present disclosure is intended to cover any variations, uses, or adaptations of the present disclosure, which follow general principles of the present disclosure and include common knowledge or customary means in the art that are not disclosed in the present disclosure. The specification and embodiments are exemplary only, with the true scope and spirit of the present disclosure being indicated by the following claims.

It should be understood that the present disclosure is not limited to the precise structure that has been described above and shown in the drawings, and various modifications and changes may be made without departing from the scope thereof. The scope of the present disclosure is limited only by the appended claims.

A safety control method, performed by a terminal, the safety control method includes:
  obtaining a transmit power threshold according to a service requirement of service transmitted between the terminal and a base station;
  detecting a relationship between a beam direction and a position of a human body when a relationship between a current transmit power of the terminal and the transmit power threshold meets a specified condition, the beam direction being a direction of a beam used by the terminal for a service transmission with the base station; and
  reporting safety control information to the base station when the relationship between the beam direction and the position of the human body meets a predetermined relationship, the safety control information being used to instruct the base station to perform a control operation related to electromagnetic radiation safety.

In some embodiments, the transmit power threshold includes a first power threshold and a second power threshold;
  obtaining the transmit power threshold according to the service requirement of the service transmitted between the terminal and the base station includes:
  obtaining a maximum power reduction under a maximum dutycycle corresponding to the service requirement and a maximum power reduction under a minimum dutycycle corresponding to the service requirement;
  obtaining the first power threshold according to a maximum transmit power of the terminal and the maximum power reduction under the maximum dutycycle; and
  obtaining the second power threshold according to the maximum transmit power of the terminal and the maximum power reduction under the minimum dutycycle, where the first power threshold is less than the second power threshold.

In some embodiments, obtaining the first power threshold according to the maximum transmit power of the terminal and the maximum power reduction under the maximum dutycycle includes:
  obtaining a first difference between the maximum transmit power of the terminal and the maximum power reduction under the maximum dutycycle; and
  taking a sum of the first difference and a power compensation factor as the first power threshold.

In some embodiments, obtaining the second power threshold according to the maximum transmit power of the terminal and the maximum power reduction under the minimum dutycycle includes:
  obtaining a second difference between the maximum transmit power of the terminal and the maximum power reduction under the minimum dutycycle; and
  taking a sum of the second difference and a power compensation factor as the second power threshold.

In some embodiments, the safety control method further includes:
  obtaining a distance between the terminal and the human body; and
  obtaining the power compensation factor according to the distance between the terminal and the human body.

In some embodiments, detecting the relationship between the beam direction and the position of the human body when the relationship between the current transmit power of the terminal and the transmit power threshold meets the specified condition includes:
  detecting whether the beam direction points to the human body when the current transmit power of the terminal is between the first power threshold and the second power threshold; and
  reporting the safety control information to the base station when the relationship between the beam direction and the position of the human body meets the predetermined relationship includes:
  reporting first safety control information to the base station when the beam direction points to the human body, the first safety control information being used to instruct the base station to reduce a dutycycle.

In some embodiments, detecting the relationship between the beam direction and the position of the human body when the relationship between the current transmit power of the terminal and the transmit power threshold meets the specified condition includes:
  detecting whether the beam is moving toward a direction of the human body when the current transmit power of the terminal is greater than or equal to the second power threshold; and
  reporting the safety control information to the base station when the relationship between the beam direction and the position of the human body meets the predetermined relationship includes:
  reporting second safety control information to the base station when the beam is moving toward the direction of the human body, the second safety control information being used to instruct the base station to prepare to switch the beam used by the terminal to a beam that does not point to or partially points to the direction of the human body.

A safety control method, performed by a base station, the safety control method includes:
  receiving safety control information which is reported by a terminal in response to determining that a relationship between a beam direction and a position of a human body meets a predetermined relationship after the terminal obtains a transmit power threshold according to a service requirement, and detects the relationship between the beam direction and the position of the human body when a relationship between a current transmit power of the terminal and the transmit power threshold meets a specified condition; and
  performing a control operation related to electromagnetic radiation safety according to the safety control information.

In some embodiments, performing the control operation related to the electromagnetic radiation safety according to the safety control information includes:
  reducing a dutycycle of the terminal when the safety control information is first safety control information; and
  preparing to switch a beam used by the terminal to a beam that does not point to or partially points to a direction of the human body when the safety control information is second safety control information.

A safety control apparatus, applied in a terminal, the safety control apparatus includes:
  a processor, and a memory configured to store instructions executable by the processor; where the processor is configured to:
  obtain a transmit power threshold according to a service requirement of service transmitted between the terminal and a base station;
  detect a relationship between a beam direction and a position of a human body when a relationship between a current transmit power of the terminal and the transmit power threshold meets a specified condition, the beam direction being a direction of a beam used by the terminal for a service transmission with the base station; and
  report safety control information to the base station when the relationship between the beam direction and the position of the human body meets a predetermined relationship, the safety control information being used to instruct the base station to perform a control operation related to electromagnetic radiation safety.

In some embodiments, the transmit power threshold includes a first power threshold and a second power threshold; the processor is further configured to:
  obtain a maximum power reduction under a maximum dutycycle corresponding to the service requirement and a maximum power reduction under a minimum dutycycle corresponding to the service requirement;
  obtain the first power threshold according to a maximum transmit power of the terminal and the maximum power reduction under the maximum dutycycle; and
  obtain the second power threshold according to the maximum transmit power of the terminal and the maximum power reduction under the minimum dutycycle, where the first power threshold is less than the second power threshold.

In some embodiments, the processor is further configured to:
  obtain a first difference between the maximum transmit power of the terminal and the maximum power reduction under the maximum dutycycle; and
  take a sum of the first difference and a power compensation factor as the first power threshold.

In some embodiments, the processor is further configured to:
  obtain a distance between the terminal and the human body; and
  obtain the power compensation factor according to the distance between the terminal and the human body.

In some embodiments, the processor is further configured to:
  obtain a second difference between the maximum transmit power of the terminal and the maximum power reduction under the minimum dutycycle; and
  take a sum of the second difference and a power compensation factor as the second power threshold.

In some embodiments, the processor is further configured to:
  obtain a distance between the terminal and the human body; and
  obtain the power compensation factor according to the distance between the terminal and the human body.

In some embodiments, the processor is further configured to:
  detect whether the beam direction points to the human body when the current transmit power of the terminal is between the first power threshold and the second power threshold; and
  report first safety control information to the base station when the beam direction points to the human body, the first safety control information being used to instruct the base station to reduce a dutycycle.

In some embodiments, the processor is further configured to:
  detect whether the beam is moving toward a direction of the human body when the current transmit power of the terminal is greater than or equal to the second power threshold; and
  report second safety control information to the base station when the beam is moving toward the direction of the human body, the second safety control information being used to instruct the base station to prepare to switch the beam used by the terminal to a beam that does not point to or partially points to the direction of the human body.

A safety control apparatus, applied in a base station, the safety control apparatus includes:
  a processor, and a memory configured to:
    receive safety control information which is reported by a terminal in response to determining that a relationship between a beam direction and a position of a human body meets a predetermined relationship after the terminal obtains a transmit power threshold according to a service requirement, and detects the relationship between the beam direction and the position of the human body when a relationship between a current transmit power of the terminal and the transmit power threshold meets a specified condition; and
    perform a control operation related to electromagnetic radiation safety according to the safety control information.

The invention claimed is:

1. A safety control method, performed by a terminal, the safety control method comprising:
  obtaining a transmit power threshold according to a service requirement of service transmitted between the terminal and a base station;
  detecting a relationship between a beam direction and a position of a human body when a relationship between a current transmit power of the terminal and the transmit power threshold meets a specified condition, the beam direction being a direction of a beam used by the terminal for a service transmission with the base station; and
  reporting safety control information to the base station when the relationship between the beam direction and the position of the human body meets a predetermined relationship, the safety control information being used to instruct the base station to perform a control operation related to electromagnetic radiation safety.

2. The safety control method according to claim 1, wherein the transmit power threshold comprises a first power threshold and a second power threshold; the method further comprising:
  obtaining the transmit power threshold according to the service requirement of the service transmitted between the terminal and the base station comprises:
    obtaining a maximum power reduction under a maximum dutycycle corresponding to the service requirement and a maximum power reduction under a minimum dutycycle corresponding to the service requirement;
    obtaining the first power threshold according to a maximum transmit power of the terminal and the maximum power reduction under the maximum dutycycle; and
    obtaining the second power threshold according to the maximum transmit power of the terminal and the maximum power reduction under the minimum dutycycle,
    wherein the first power threshold is less than the second power threshold.

3. The safety control method according to claim 2, wherein obtaining the first power threshold according to the maximum transmit power of the terminal and the maximum power reduction under the maximum dutycycle comprises:
  obtaining a first difference between the maximum transmit power of the terminal and the maximum power reduction under the maximum dutycycle; and
  taking a sum of the first difference and a power compensation factor as the first power threshold.

4. The safety control method according to claim 3, further comprising:
  obtaining a distance between the terminal and the human body; and
  obtaining the power compensation factor according to the distance between the terminal and the human body.

5. The safety control method according to claim 2, wherein obtaining the second power threshold according to the maximum transmit power of the terminal and the maximum power reduction under the minimum dutycycle comprises:
  obtaining a second difference between the maximum transmit power of the terminal and the maximum power reduction under the minimum dutycycle; and
  taking a sum of the second difference and a power compensation factor as the second power threshold.

6. The safety control method according to claim 5, further comprising:
  obtaining a distance between the terminal and the human body; and
  obtaining the power compensation factor according to the distance between the terminal and the human body.

7. The safety control method according to claim 2,
  wherein detecting the relationship between the beam direction and the position of the human body when the relationship between the current transmit power of the terminal and the transmit power threshold meets the specified condition comprises:
    detecting whether the beam direction points to the human body when the current transmit power of the terminal is between the first power threshold and the second power threshold; and
  reporting the safety control information to the base station when the relationship between the beam direction and the position of the human body meets the predetermined relationship comprises:
    reporting first safety control information to the base station when the beam direction points to the human body, the first safety control information being used to instruct the base station to reduce a dutycycle.

8. The safety control method according to claim 2,
  wherein detecting the relationship between the beam direction and the position of the human body when the relationship between the current transmit power of the terminal and the transmit power threshold meets the specified condition comprises:
    detecting whether the beam is moving toward a direction of the human body when the current transmit power of the terminal is greater than or equal to the second power threshold; and
  reporting the safety control information to the base station when the relationship between the beam direction and the position of the human body meets the predetermined relationship comprises:
    reporting second safety control information to the base station when the beam is moving toward the direction of the human body, the second safety control information being used to instruct the base station to prepare to switch the beam used by the terminal to a beam that does not point to or partially points to the direction of the human body.

9. A safety control method, performed by a base station, the safety control method comprising:
  receiving safety control information, which is reported by a terminal in response to determining that a relationship between a beam direction and a position of a human body meets a predetermined relationship after the terminal obtains a transmit power threshold according to a service requirement, and detects the relationship between the beam direction and the position of the human body when a relationship between a current transmit power of the terminal and the transmit power threshold meets a specified condition; and performing a control operation related to electromagnetic radiation safety according to the safety control information.

10. The safety control method according to claim 9, wherein performing the control operation related to the electromagnetic radiation safety according to the safety control information comprises:

reducing a dutycycle of the terminal when the safety control information is first safety control information; and preparing to switch a beam used by the terminal to a beam that does not point to or partially points to a direction of the human body when the safety control information is second safety control information.

11. A safety control apparatus, applied in a base station, the safety control apparatus comprising:

a processor, and a memory configured to store instructions executable by the processor;

wherein the processor is configured to execute the instructions to perform the safety control method according to claim 9.

12. A safety control apparatus, applied in a terminal, the safety control apparatus comprising:

a processor, and a memory configured to store instructions executable by the processor;

wherein the processor is configured to:

obtain a transmit power threshold according to a service requirement of service transmitted between the terminal and a base station;

detect a relationship between a beam direction and a position of a human body when a relationship between a current transmit power of the terminal and the transmit power threshold meets a specified condition, the beam direction being a direction of a beam used by the terminal for a service transmission with the base station; and report safety control information to the base station when the relationship between the beam direction and the position of the human body meets a predetermined relationship, the safety control information being used to instruct the base station to perform a control operation related to electromagnetic radiation safety.

13. The safety control apparatus according to claim 12, wherein the transmit power threshold comprises a first power threshold and a second power threshold;

the processor is further configured to:

obtain a maximum power reduction under a maximum dutycycle corresponding to the service requirement and a maximum power reduction under a minimum dutycycle corresponding to the service requirement;

obtain the first power threshold according to a maximum transmit power of the terminal and the maximum power reduction under the maximum dutycycle; and obtain the second power threshold according to the maximum transmit power of the terminal and the maximum power reduction under the minimum dutycycle, wherein the first power threshold is less than the second power threshold.

14. The safety control apparatus according to claim 13, wherein the processor is further configured to:

obtain a first difference between the maximum transmit power of the terminal and the maximum power reduction under the maximum dutycycle; and take a sum of the first difference and a power compensation factor as the first power threshold.

15. The safety control apparatus according to claim 14, wherein the processor is further configured to:

obtain a distance between the terminal and the human body; and obtain the power compensation factor according to the distance between the terminal and the human body.

16. The safety control apparatus according to claim 13, wherein the processor is further configured to:

obtain a second difference between the maximum transmit power of the terminal and the maximum power reduction under the minimum dutycycle; and take a sum of the second difference and a power compensation factor as the second power threshold.

17. The safety control apparatus according to claim 16, wherein the processor is further configured to:

obtain a distance between the terminal and the human body; and obtain the power compensation factor according to the distance between the terminal and the human body.

18. The safety control apparatus according to claim 13, the processor is further configured to:

detect whether the beam direction points to the human body when the current transmit power of the terminal is between the first power threshold and the second power threshold; and report first safety control information to the base station when the beam direction points to the human body, the first safety control information being used to instruct the base station to reduce a dutycycle.

19. The safety control apparatus according to claim 13, the processor is further configured to:

detect whether the beam is moving toward a direction of the human body when the current transmit power of the terminal is greater than or equal to the second power threshold; and report second safety control information to the base station when the beam is moving toward the direction of the human body, the second safety control information being used to instruct the base station to prepare to switch the beam used by the terminal to a beam that does not point to or partially points to the direction of the human body.

* * * * *